(12) United States Patent
An et al.

(10) Patent No.: US 7,640,841 B2
(45) Date of Patent: Jan. 5, 2010

(54) ANNULAR SEAL AND PUMP INCLUDING SAME

(75) Inventors: Jonathan An, Murrietta, CA (US); Robert Thomas Racicot, Murrietta, CA (US)

(73) Assignee: Saint-Gobain Performance Plastics Corporation, Worcester, MA (US)

( * ) Notice: Subject to any disclaimer, the term of this patent is extended or adjusted under 35 U.S.C. 154(b) by 356 days.

(21) Appl. No.: 11/619,116

(22) Filed: Jan. 2, 2007

(65) Prior Publication Data

US 2007/0180987 A1  Aug. 9, 2007

Related U.S. Application Data

(60) Provisional application No. 60/756,438, filed on Jan. 5, 2006.

(51) Int. Cl.
*F16J 15/32* (2006.01)
*F04B 53/00* (2006.01)

(52) U.S. Cl. .......................................... 92/168; 277/553

(58) Field of Classification Search ............... 92/165 R, 92/168; 277/314, 395, 553
See application file for complete search history.

(56) References Cited

U.S. PATENT DOCUMENTS

| | | | |
|---|---|---|---|
| 2,168,818 A * | 8/1939 | Condon | 277/553 |
| 4,050,701 A | 9/1977 | Webb | |
| 4,333,977 A | 6/1982 | Abrahams et al. | |
| 4,502,694 A | 3/1985 | Uhrner | |
| 4,706,970 A * | 11/1987 | Ramirez | 277/556 |
| 4,721,312 A | 1/1988 | Hornberger | |
| 4,735,144 A | 4/1988 | Jenkins | |
| 4,749,752 A | 6/1988 | Youlu et al. | |
| 4,750,748 A | 6/1988 | Visser | |
| 4,804,290 A | 2/1989 | Balsells | |
| 4,819,443 A | 4/1989 | Watanabe et al. | |
| 4,907,788 A * | 3/1990 | Balsells | 277/553 |
| 5,144,882 A * | 9/1992 | Weissgerber | 92/168 |
| 5,494,300 A | 2/1996 | Tanaka et al. | |
| 5,575,634 A | 11/1996 | Tanaka et al. | |
| 5,671,656 A * | 9/1997 | Cyphers et al. | 92/168 |
| 5,763,082 A | 6/1998 | Kokumai et al. | |

(Continued)

FOREIGN PATENT DOCUMENTS

DE        2113557 A        9/1971

(Continued)

OTHER PUBLICATIONS

Mark P. Wolverton et al.; "Tribological Properties of Reinforced and Lubricated Thermoplastic Composites at Elevated Temperatures"; Session 15-B, pp. 1-8; Feb. 7-11, 1983.

(Continued)

*Primary Examiner*—Thomas E Lazo
(74) *Attorney, Agent, or Firm*—Larson Newman & Abel, LLP; Chi Suk Kim

(57) ABSTRACT

A seal includes a seal body forming an annular sealing surface. The annular sealing surface includes an annular ridge protruding substantially radially from the annular sealing surface. The seal body includes an annular cavity. The seal also includes first and second annular springs located adjacent to each other in the annular cavity.

23 Claims, 4 Drawing Sheets

U.S. PATENT DOCUMENTS

| | | |
|---|---|---|
| 5,767,186 A | 6/1998 | Shimokusuzono et al. |
| 5,992,856 A * | 11/1999 | Balsells et al. ............. 277/553 |
| 6,341,384 B1 | 1/2002 | Hayes |
| 6,376,109 B1 | 4/2002 | Sano et al. |
| 6,419,236 B1 * | 7/2002 | Janian ...................... 277/553 |
| 6,749,649 B2 | 6/2004 | Sano et al. |
| 6,918,595 B2 * | 7/2005 | Proper ...................... 277/553 |
| 2001/0039966 A1 | 11/2001 | Walpole et al. |
| 2002/0086191 A1 | 7/2002 | Sano et al. |
| 2002/0090537 A1 | 7/2002 | Sano et al. |
| 2002/0153664 A1 | 10/2002 | Schroeder |
| 2002/0155289 A1 | 10/2002 | Cistone et al. |
| 2003/0085532 A1 | 5/2003 | Spiegl et al. |
| 2003/0085533 A1 | 5/2003 | Spiegl et al. |
| 2003/0144156 A1 | 7/2003 | Saito |
| 2004/0208406 A1 | 10/2004 | Budde et al. |
| 2005/0106970 A1 | 5/2005 | Stanitis et al. |
| 2005/0121437 A1 | 6/2005 | Spohn et al. |
| 2005/0189725 A1 | 9/2005 | Edwards |
| 2005/0221038 A1 | 10/2005 | Park |

FOREIGN PATENT DOCUMENTS

| | | |
|---|---|---|
| EP | 0 202 996 A2 | 11/1986 |
| EP | 0 850 993 A1 | 7/1998 |
| EP | 0 874 023 A1 | 10/1998 |
| EP | 0 583 481 B1 | 11/1999 |
| EP | 0 739 046 B1 | 3/2000 |
| EP | 0 916 044 B1 | 4/2003 |
| EP | 1 584 645 A1 | 10/2005 |
| JP | 61-169231 | 7/1986 |
| JP | 62-105623 | 5/1987 |
| JP | 62-146944 | 6/1987 |
| JP | 3-273083 | 12/1991 |
| JP | 6-340866 | 12/1994 |
| JP | 07-062184 | 3/1995 |
| JP | 7-268126 | 10/1995 |
| JP | 8-105391 | 4/1996 |
| JP | 10-237301 | 9/1998 |
| JP | 10-237421 | 9/1998 |
| JP | 2001-115976 | 4/2001 |
| JP | 2001-181603 | 7/2001 |
| WO | WO 96/40857 | 12/1996 |
| WO | WO 99/11355 | 3/1999 |
| WO | WO 01/06881 A1 | 2/2001 |
| WO | WO 01/18289 A1 | 3/2001 |
| WO | WO 02/20886 A1 | 3/2002 |
| WO | WO 02/43881 A1 | 6/2002 |
| WO | WO 2005/056647 A2 | 6/2005 |
| WO | WO 2005/064212 A2 | 7/2005 |
| WO | WO 2005/119103 | 12/2005 |

OTHER PUBLICATIONS

Kevin Yu et al.; "Wear Tests of Polymer Composite Compressor Seal Materials in Hydrogen Environment"; Paper No. 52; Copyright 1999 by NACE International.

"Buckyballs, Diamond, and Graphite"; on-line, BDG Graphite and Carbon Fibers; pp. 1-13; Dec. 22, 2005.

"Dyneon TFM PTFE, Improved performance and design flexibility"; on-line, pp. 1-20; Copyright Dyneon 2002.

* cited by examiner

ANNULAR SEAL AND PUMP INCLUDING SAME

FIELD OF THE DISCLOSURE

This disclosure, in general, relates to annular seals and pumps including such annular seals.

BACKGROUND

Traditionally, seals are used to prevent fluids from flowing between joints of rigid components. In particular examples, seals are used in pumps and between flanges to limit fluid flow out of containment regions. For example, seals along pump shafts may limit lubricating fluids or pressurized process fluids from escaping along an annulus defined by the shaft and a housing. Typically, such seals have been formed of malleable materials, such as graphite or metal strips in the case of flange seals or elastomeric materials in the case of shaft seals. However, traditional materials have proven ill suited for new applications, such as high-pressure liquid chromatography systems.

High-pressure liquid chromatography uses a high-pressure liquid carrier medium to separate chemical species by moving the species across an adsorption medium. Different chemical components adsorb on and desorb from the adsorption medium at different rates, resulting in separation of the components as the carrier medium moves through or around the adsorption medium. To avoid contamination of the adsorption medium, some typical pumps are designed to operate without the use of lubricants because the liquid carrier medium used in such high-pressure liquid chromatography systems often acts as a strong solvent and lubricant dissolved in such solvents may contaminate adsorption media. Further, the liquid carrier medium may adversely affect sealing materials and the high pressure of such mediums may lead to leaking and low seal lifetimes. Other typical seal designs may increase wear on pump components, such as rods or shafts.

As such, an improved seal and an improved pump for use in such systems would be desirable.

SUMMARY

In a particular embodiment, a seal includes a seal body forming an annular sealing surface. The annular sealing surface includes an annular ridge protruding substantially radially from the annular sealing surface. The seal body includes an annular cavity. The seal also includes first and second annular springs located adjacent to each other in the annular cavity.

In another exemplary embodiment, a seal includes a seal body forming first and second annular sealing surfaces. The seal body includes an annular cavity located between the first and second annular sealing surfaces. The first and second annular sealing surfaces are configured to be substantially parallel when engaged between a housing and a rod. The seal also includes first and second annular springs located adjacent to each other in the annular cavity.

In a further exemplary embodiment, a pump includes a housing including an axial bore, a rod located within the axial bore, and an annular seal located between the housing and the rod. The annular seal includes a seal body forming first and second annular sealing surfaces. The seal body includes an annular cavity located between the first and second annular sealing surfaces. The first and second annular sealing surfaces are substantially parallel. The first annular sealing surface contacts the rod and the second annular sealing surface contacts the housing. The annular seal also includes first and second annular springs located adjacent to each other in the annular cavity.

In an additional embodiment, a pump includes a housing including an axial bore, a rod located within the axial bore, and an annular seal located between the housing and the rod. The annular seal includes a seal body forming an annular sealing surface. The annular sealing surface includes a ridge protruding radially from the annular surface. The seal body includes an annular cavity. The annular seal also includes first and second annular springs located adjacent to each other in the annular cavity.

BRIEF DESCRIPTION OF THE DRAWINGS

The present disclosure may be better understood, and its numerous features and advantages made apparent to those skilled in the art by referencing the accompanying drawings.

DESCRIPTION OF THE PREFERRED EMBODIMENTS

In a particular embodiment, a seal includes a seal body forming an annular sealing surface. The seal body includes an annular ridge protruding substantially radially from the annular sealing surface. In addition, the seal body includes an annular cavity. The seal further includes first and second annular springs located adjacent to each other in the annular cavity. In an example, the seal body may further include a second annular sealing surface. The second annular sealing surface may radially overlie the first annular sealing surface along a radial vector and may form an opposite annular sealing surface to the first annular sealing surface. Further, the seal body may include a second annular ridge protruding radially from the second annular sealing surface. In a particular example, the seal body is formed of a composite material including a fluoropolymer, an aromatic polymer, and graphite fiber. The seal may be included in a pump. For example, the first annular surface may contact a rod of the pump and a second annular surface may contact a housing, thus preventing fluid flow in an axial direction.

Figure 1:
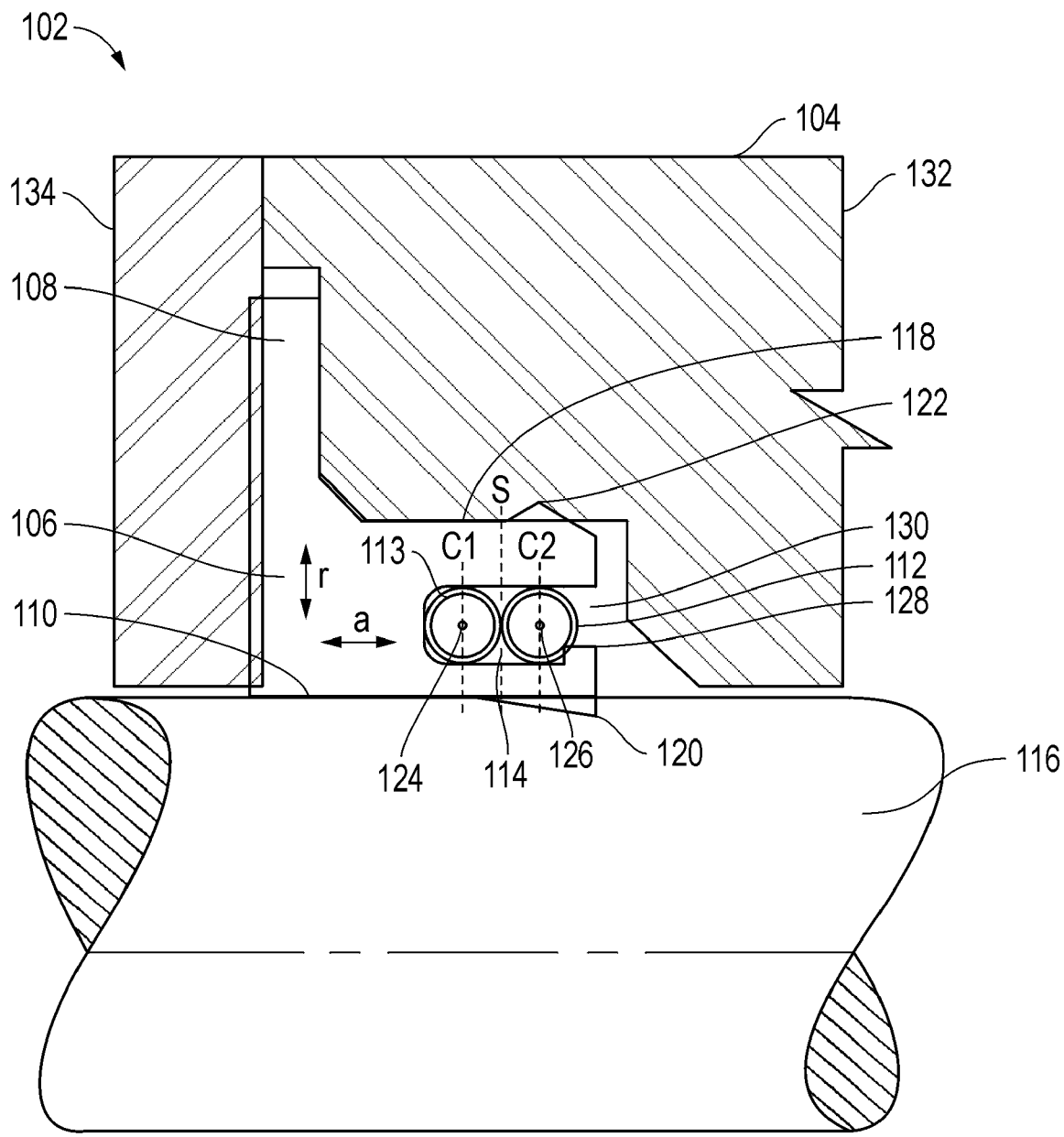
FIG. 1 includes an illustration of a portion of an exemplary pump including a seal.

FIG. 1 includes an illustration of a portion 102 of an exemplary pump. As illustrated, directional indicator "r" represents a radial direction and directional indicator "a" represents an axial direction. The portion 102 of the pump may include a housing 104 having an axial bore through which a rod 116 is inserted. A seal body 106 is located between the housing 104 and the rod 116. As illustrated, the housing 104 includes first and second portions 132 and 134 configured to engage a flange 108 of the seal body 106. Alternatively, the housing 104 may be formed as a single piece. In the exemplary embodiment illustrated in FIG. 1, the flange 108 extends radially at one axial end of the seal body 106. Alternatively, the seal body 106 may be formed without a flange.

In an exemplary embodiment, the seal body 106 forms an annular sealing surface 110 configured to contact the rod 116. In addition, the seal body 106 forms an annular sealing surface 118 configured to contact the housing 104. An annular sealing surface is a surface configured to seal against an opposing surface and configured to extend axially and circumferentially along the surface of an annular shape, such as the seal body 106. As illustrated, the annular sealing surface 110 forms an innermost annular sealing surface for direct contact with the rod 116. In another example, the annular sealing surface 118 forms an axial and circumferential surface along an outermost portion of the annular seal body 106 that is configured to directly contact the housing 104. In a particular embodiment, the annular sealing surface 110 and the annular sealing surface 118 form opposite sides of the seal 106 and are configured to be substantially parallel when engaged between the housing 104 and the rod 116.

In an embodiment, the seal body 106 includes an annular cavity 114, housing first and second annular springs 112 and 113. The first and second annular springs 112 and 113 are located adjacent to each other. As illustrated, the first and second annular springs 112 and 113 may be located axially adjacent to each other along a line (not shown) parallel to the rod or the axial direction. Alternatively, the first and second annular springs 112 and 113 may be radially adjacent to each other along a line (not shown) extending in the radial direction. In a particular example, the first and second annular springs 112 and 113 may directly contact each other or may include sheaths that directly contact each other.

In an embodiment, the seal body 106 defines an opening 130 to the cavity 114. The opening 130 may be located at an axially end of the seal body 106. For example, the opening 130 may be located at an axial end of the seal body 106 opposite the axial end of the flange 108. In a particular embodiment, the opening 130 is associated with the low-pressure side of the pump. Alternatively, the opening 130 may be associated with the high-pressure side of the pump. Further, the seal body 106 may define an annular lip 128 at the opening 130. In an example, the annular lip 128 is located on a rod side of the opening 130. Alternatively, the annular lip may be located on the housing side of the opening 130. In another example, the opening 130 may be defined by two annular lips.

In the illustration of FIG. 1, a sectioning line S extending radially through the cavity bisects the annular sealing surface 110 and the annular sealing surface 118. For example, the annular sealing surface 118 and the cavity may overlie the annular sealing surface 110 when viewed outwardly along the sectioning line S or along a radial vector extending outwardly. In a particular example, the cavity 114 when viewed along sectioning lines extending through each axial end of the cavity 114 (not shown) underlies the annular sealing surface 118 and overlies the annular sealing surface 110, but does not underlie the flange 108. For example, a section line bisecting the cavity 114 along a radius does not bisect the flange 108. In another example, the flange 108 at least partially traverses and end of the cavity 114.

The seal body 106 also may include an annular ridge 120 extending radially inwardly from the annular sealing surface 110. As illustrated in FIG. 1, ridges and edges are illustrated in a precompressed form to illustrate the form of the seal body prior to distortion by compression between the rod 116 and the housing 104. The annular ridge 120 may form a shape, such as a sharp ridge, a square ridge, or a rounded ridge. In addition, the seal body 106 may include two, three, or more annular ridges extending or protruding radially inwardly from the annular sealing surface 110. Further, the annular ridge 120 may have a peak that is located under the opening 130 or the cavity 114 when viewed along a radial vector (not shown). In a particular example, the peak of the annular ridge 120 is axially spaced apart from a center point (124 or 126) of at least one of the first and second annular springs 112 and 113. For example, the peak of the annular ridge 120 may have location axially closer to the opening than radial bisecting lines C1 and C2 extending through the spring center points 124 and 126, respectively. In a further example, the seal body 106 may include a second annular ridge 122 extending radially outwardly from the second annular sealing surface 118. Here too, the annular ridge 122 may form a shape, such as a sharp edge, a squared edge, or a rounded edge. As with the annular ridge 120, the annular ridge 122 may have a peak located at a different axial location than lines C1 and C2 bisecting one of the center points, 124 or 126, of each of the annular springs 112 and 113. The seal body 106 may also include additional annular ridges extending or protruding radially from the annular surface 118.

In particular applications, such as high-pressure liquid chromatography, the rod 116 may be formed of sapphire. The seal body 106 may be formed of a composite material including a fluoropolymer, an aromatic polymer and graphite fiber. In an exemplary embodiment, the composite material includes a polymer matrix of fluoropolymer, and in particular, a fluoropolymer that exhibits a low coefficient of friction. An exemplary fluoropolymer includes a polymer formed from a fluorine substituted olefin monomer or a polymer including at least one monomer selected from the group consisting of vinylidene fluoride, vinylfluoride, tetrafluoroethylene, hexafluoropropylene, trifluoroethylene, chlorotrifluoroethylene, and a mixture of such fluorinated monomers. An exemplary fluoropolymer may include a polymer, a polymer blend or a copolymer including one or more of the above monomers, such as, for example, fluorinated ethylene propylene (FEP), ethylene-tetrafluoroethylene (ETFE), polytetrafluoroethylene-perfluoropropylvinylether (PFA), poly tetrafluoroethylene-perfluoromethylvinylether (MFA), polytetrafluoroethylene (PTFE), polyvinylidene fluoride (PVDF), ethylene chlorotrifluoroethylene (ECTFE), polychlorotrifluoroethylene (PCTFE), or tetrafluoroethylene-hexafluoropropylene-vinylidene fluoride (THV). In particular, the fluoropolymer may be polytetrafluoroethylene (PTFE), such as a modified PTFE. In an example, the modified PTFE is a copolymer of tetrafluoroethylene and a vinyl ether, such as perfluoropropylvinylether (PPVE). In an embodiment, the modified PTFE includes at least about 0.01 wt % perfluoropropylvinylether (PPVE). In another example, the modified PTFE includes not greater than about 5.0 wt % PPVE, such as not greater than about 3.0 wt %, or not greater than about 1.5 wt % PPVE. While particular embodiments of modified PTFE that include PPVE are melt processable, a particularly useful modified PTFE includes a small amount of PPVE such that the modified PTFE is not melt processable and instead is typically solution deposited and sintered. Particular examples of modified PTFE are commercially available, such as TFM1700 available from Dyneon, Teflon® NXT available from DuPont®, and M1-11 available from Daikon.

The material may include at least about 80.0 wt % fluoropolymer. For example, the material may include about 80.0 wt % to about 95.0 wt % fluoropolymer, such as about 85.0 wt % to about 91.0 wt % fluoropolymer. In a particular example, the material includes about 80.0 wt % to about 95.0 wt % modified PTFE, such as about 85.0 wt % to about 91.0 wt % of the modified PTFE.

In an exemplary embodiment, the material includes an aromatic polymer. For example, the aromatic polymer may include phenyl polymer, such as polyphenylenesulfide or polyphenyleneoxide. In a particular example, the aromatic polymer includes polyphenylenesulfide. The material may include about 1.0 wt % to about 10.0 wt % of the aromatic polymer. For example, the material may include about 3.0 wt % to about 7.0 wt % of the aromatic polymer. In a particular example, the composite material includes about 1.0 wt % to about 10.0 wt %, such as about 3.0 wt % to about 7.0 wt % polyphenylenesulfide.

In addition, the composite material includes graphite fiber. Graphite fiber is differentiated from traditional carbon fibers by crystalline structure and is differentiated from traditional graphite by form. Typically, carbon fibers are formed from organic polymers, such as polyacrylonitrile, or are formed from pitch. The organic fibers are generally treated through oxidation in air at between about 200° C. and 300° C. to form non-meltable precursor fibers. Such precursor fibers are heated in a nitrogen environment at about 1000° C. to about 2500° C. to form carbon fibers. Often such carbon fibers include at least about 92.0 wt % carbon. In an exemplary embodiment, graphite fibers may be formed by heating such carbon fibers at between about 2500° C. to about 3000° C., resulting in the distinct crystalline structure of graphite while maintaining a fiber form. As a result, carbon fibers are differentiable from graphite fibers by observing crystalline structure, such as through x-ray diffraction.

With respect to graphite, graphite is typically particulate in form and thus is different from the graphite fibers of the disclosed composite material. Particulate graphite is often formed by crushing mineral graphite or through heating of petroleum products at about 2800° C. Such processes produce graphite particulate that is different in both form and mechanical properties from the graphite fibers formed through methods, such as the exemplary method disclosed above.

In an exemplary embodiment, the composite material includes about 1.0 wt % to about 10.0 wt % of the graphite fiber. For example, the material may include about 3.0 wt % to about 7.0 wt % of the graphite fiber.

Returning to FIG. 1, the annular springs 112 and 113 may each be a single coil spring or a double coil spring. Depending on the application, the annular springs 112 and 113 may be formed of corrosion-resistant metal, such as stainless steel. In particular, the annular springs may be formed of a stainless steal, such as a 304 stainless steel. Alternatively, the annular springs may be formed of a flexible metal or a polymer.

Figure 2:
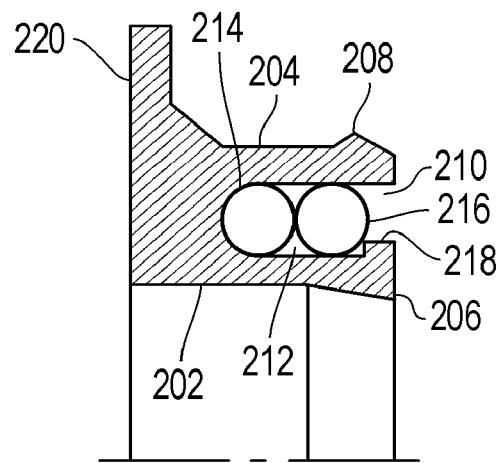
FIGS. 2, 3, 4, 5, 6, 7, 8, 9, 10, 11, 12, and 13 include illustrations of exemplary seals for use in pumps, such as the portion of the pump illustrated in FIG. 1.
Figure 3:
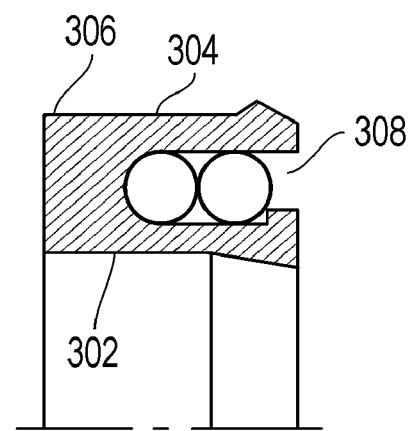

FIGS. 2, 3, 4, 5, 6, 7, 8, 9, 10, 11, 12, and 13 illustrate alternative embodiments of the annular seal. As illustrated in FIG. 2, the annular seal includes annular sealing surfaces 202 and 204. The seal body includes annular ridges 206 and 208 having sharp peaks and protruding from the annular sealing surfaces 202 and 204, respectively. In addition, the annular seal includes a cavity 212. The seal body defines an opening 210 to the cavity 212, further defined by a lip 218 located on the radially inward side or rod side of the opening. Within the cavity 212, annular springs 214 and 216 are located axially adjacent to each other. On an axially end opposite the opening 210, a flange 220 extends radially outwardly from an outermost annular sealing surface 204. FIG. 3 illustrates an alternative embodiment in which the seal body includes annular sealing surfaces 302 and 304 and defines an opening 308 at a first axial end. However, the second axial end 306 opposite the opening 308 does not include a flange.

Figure 4:
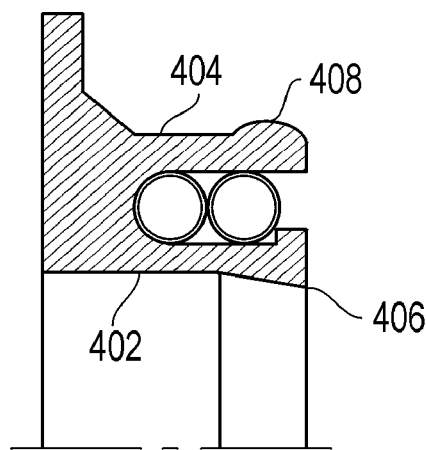
Figure 5:
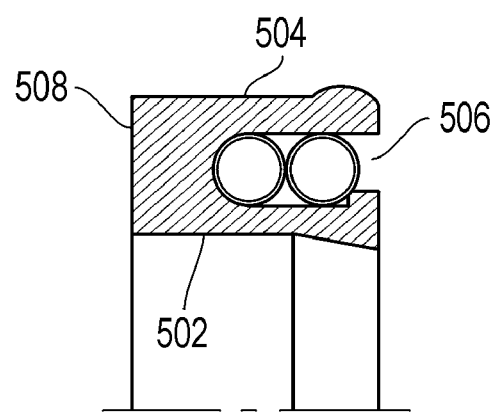

FIGS. 4 and 5 illustrate alternative embodiments of the seal, with and without flanges, respectively. As illustrated in FIG. 4, annular sealing surfaces 402 and 404 include annular ridges 406 and 408, respectively. Annular ridge 406 has a sharp peak and annular ridge 408 has a rounded peak. As illustrated in FIG. 5, the seal body includes annular sealing surfaces 502 and 504. An axial end 508 opposite the opening 506 does not include a flange.

Figure 6:
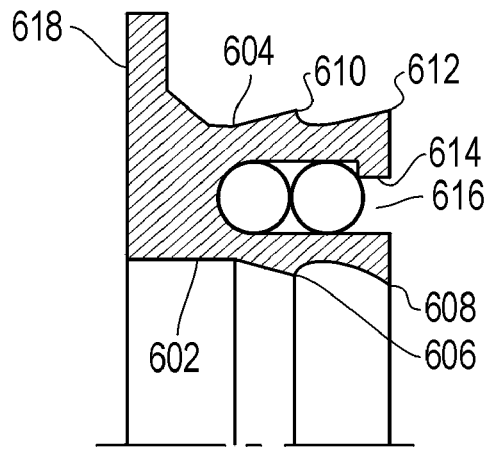
Figure 7:
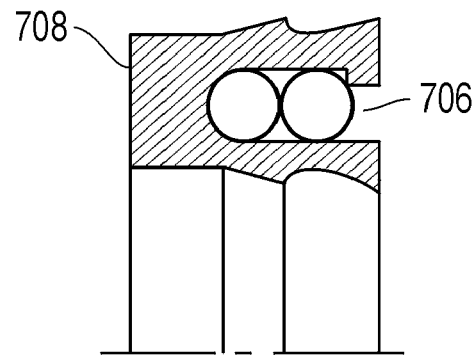

In further exemplary embodiments, FIGS. 6 and 7 illustrate exemplary seals, with and without flanges, respectively. As illustrated in FIG. 6, a seal includes annular sealing surfaces 602 and 604. The seal body includes annular ridges 606 and 608 protruding radially inwardly from the annular sealing surface 602. The annular ridges 606 and 608 exhibit sharp edges. Each of the sharp edges or peaks is offset or axially spaced apart from the centerlines of the annular springs. For example, the peak of the ridge 608 is located closer to the opening than both annular springs and the peak of the ridge 606 is located closer to the opening than one of the annular springs. The seal body also includes annular ridges 610 and 612 protruding radially outwardly from the annular sealing surface 604. As illustrated, the annular ridges 610 and 612 exhibit sharp peaks offset axially from the centerlines of the annular springs. In addition, the seal body includes a lip 614 defining a radially outside annular edge of the opening 616. The seal further includes a flange 618 located at an axial end opposite the opening 616. FIG. 7 illustrates another exemplary embodiment in which the axial end 708 opposite the opening 706 does not include a flange.

Figure 8:
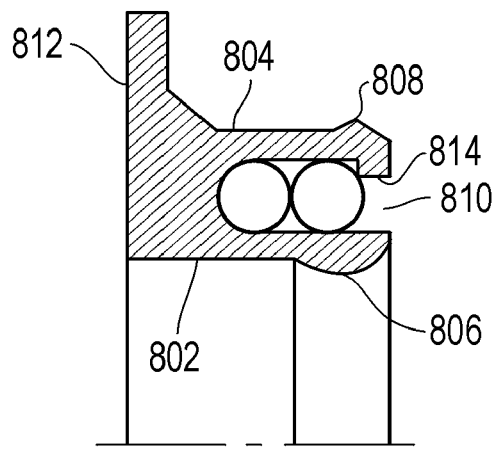
Figure 9:
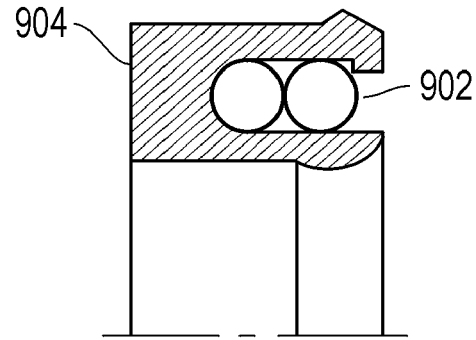

In other exemplary embodiments, FIGS. 8 and 9 illustrate exemplary seals, with and without flanges, respectively. As illustrated in FIG. 8, the seal body includes annular sealing surfaces 802 and 804. The seal body forms annular ridges 806 and 808 extending from the annular sealing surfaces 802 and 804, respectively. As illustrated, the annular sealing ridge 806 protruding from the annular surface 802 forms a rounded shape. The annular ridge 808 protruding from the annular sealing surface 804 forms a sharp ridge. A lip 814 defines a radially outermost rim of the opening 810. In addition, the opening 810 is located on an end opposite the axial end including the flange 812. An alternative embodiment illustrated in FIG. 9 includes an axial end 904 opposite the opening 902 that does not include a flange.

Figure 10:
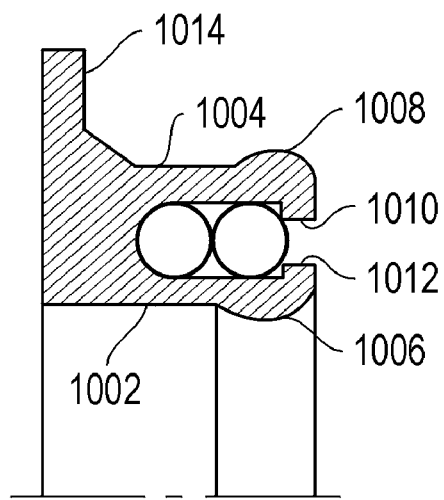
Figure 11:
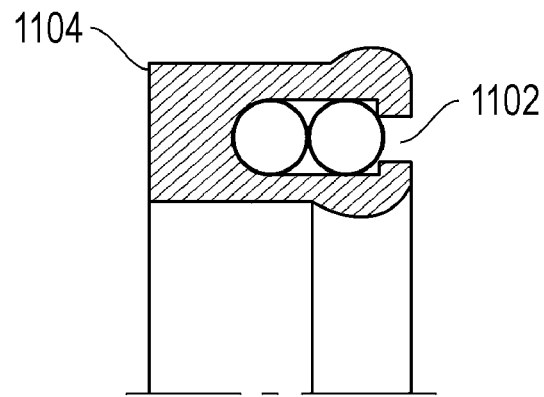

In further exemplary embodiments, FIGS. 10 and 11 illustrate exemplary seals, with and without flanges, respectively. As illustrated in FIG. 10, rounded annular ridges 1006 and 1008 protrude from annular sealing surfaces 1002 and 1004, respectively. An opening to a cavity of the seal is defined by two annular lips 1010 and 1012 located at the radial outside and radial inside of the opening, respectively. In addition, the annular seal illustrated in FIG. 10 includes a flange 1014. FIG. 11 illustrates an alternative embodiment in which an axial end 1104 opposite the opening 1102 does not include a flange.

Figure 12:
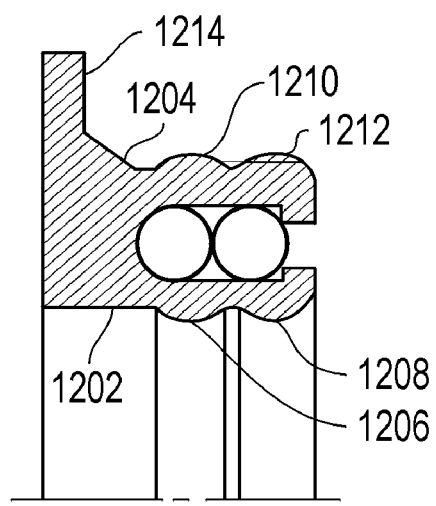
Figure 13:
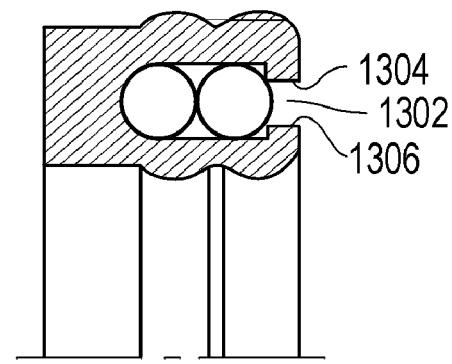

In alternative embodiments, FIGS. 12 and 13 illustrate exemplary seals including more than one rounded ridge protruding from each of the annular sealing surfaces. For example, FIG. 12 illustrates a seal body including an annular sealing surface 1202 and rounded annular ridges 1206 and 1208 extending radially inward from the annular sealing surface 1202. Annular ridges 1210 and 1212 protrude radially outward from the annular sealing surface 1204. The seal body illustrated in FIG. 12 also includes a flange 1214. FIG. 13 illustrates a flangeless embodiment of the seal in which an opening 1302 is defined by annular lips 1304 and 1306 extending on the radial outside and radial inside of the opening 1302, respectively.

Particular embodiments of the seal advantageously improve pump life. For example, embodiments of the seal may exhibit increased life times when exposed to high pressure liquid chromatography carrier media. Further, embodiments of the seal may exhibit low wear on pump components, such as rods, and, in particular, sapphire rods.

EXAMPLE

Seals of the design illustrated in FIG. 1 are formed of 90.0 wt % modified PTFE, 5.0 wt % polyphenylenesulfide, and 5.0 wt % graphite fiber. The seals are rated based on the total time to failure in the presence of one of three fluids.

The seals are tested in a Shimadzu LC10ATvp high pressure liquid chromatography (HPLC) pump. The pump is designed with two heads that operate in a series. One seal is installed in each head. The seal is installed over a sapphire rod and the pump head is secured to the main pump body. The sapphire rod operates in a reciprocating linear motion to produce a pumping action. A new sapphire rod is used for each test.

The pump operates at a pressure of 20 MPa (2900 psi) and a flow rate of 5 ml/min. The seals are tested for leakage in the presence of one of three fluids: de-ionized water, methanol, or a blend of 30% 0.1 M phosphoric buffer solution and 70% methanol.

Pump head seal leakage is evaluated by forcing air through a tube or port on the top side of the pump head housing. Leakage is indicated by placing a collection tissue at the bottom base of the pump head. When seal leakage occurs, the action of the forced air down the backside pump head expels moisture down on to the collection tissue. When wetness is observed, a leakage failure is declared.

TABLE 1

Seal performance in the presence of liquid carrier media.

| Test Number | Fluid | Hours to Failure |
| --- | --- | --- |
| 1 | Methanol | 317 hours |
| 2 | Methanol | 553 hours |
| 3 | Buffer Solution | 333 hours |
| 4 | Buffer Solution | 524 hours |
| 5 | De-ionized water | 332 hours |
| 6 | De-ionized water | 407 hours |

Each of the samples exhibits a time to failure of at least about 300 hours in the presence of one of the solvents. In addition, the sapphire rods of the tests exhibit little or no scratching or scarring.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A seal comprising:
a seal body forming first and second annular sealing surfaces, the first annular sealing surface being a radially innermost peripheral surface in contact with a rod, the second annular sealing surface located on a radially opposite side of the seal body from the first annular sealing surface and configured to be substantially parallel to the first annular sealing surface when engaged in and in contact with a housing, the first annular sealing surface including an annular ridge protruding substantially radially inwardly from the first annular sealing surface, the seal body including an annular cavity; and first and second annular springs located axially adjacent to each other in the annular cavity.

2. The seal of claim 1, wherein the seal body includes a second annular ridge protruding substantially radially from the first annular sealing surface.

3. The seal of claim 1, wherein the seal body comprises a second annular ridge extending radially from the second annular sealing surface.

4. The seal of claim 1, wherein the second annular sealing surface and the annular cavity radially overlie the annular sealing surface along a radial vector bisecting the cavity.

5. The seal of claim 1, wherein at least one of the first and second springs is a double coil spring.

6. The seal of claim 1, wherein the seal body further comprises a flange.

7. The seal of claim 1, wherein the seal body defines an opening to the annular cavity.

8. The seal of claim 7, wherein the opening opens in an axial direction at an axial end of the seal body.

9. The seal of claim 7, wherein the seal body includes an annular lip defining at least one side of the opening.

10. The seal of claim 8, wherein a flange extends radially outwardly at a second axial end of the seal body.

11. The seal of claim 8, wherein the location of a peak of the annular ridge is axially closer to the opening of the annular cavity than a center line of each of the first and second annular springs.

12. The seal of claim 1, wherein the seal body is formed of a composite material comprising perfluoropropylvinylether modified polytetrafluoroethylene.

13. The seal of claim 1, wherein the seal body is formed of a composite material comprising graphite fiber.

14. A seal comprising:
a seal body forming first and second annular sealing surfaces, the seal body including an annular cavity located between the first and second annular sealing surfaces, the first and second annular sealing surfaces configured to be substantially parallel when engaged between a housing and a rod, the first annular sealing surface being an innermost sealing surface to contact the rod, the seal body including an annular ridge protruding radially inwardly from the first annular sealing surface, the second annular sealing surface being an outermost sealing surface to contact the housing, the seal body including a second annular ridge protruding radially outwardly from the second annular sealing surface, the second annular sealing surface and the annular cavity radially overlying the first annular sealing surface along sectioning lines extending radially through the annular cavity, the seal body including a third annular ridge protruding radially inwardly from the first annular sealing surface; and first and second annular springs located axially adjacent to each other in the annular cavity.

15. The seal of claim 14, further comprising a flange extending radially outwardly from a first axial end of the seal body.

16. The seal of claim 15, wherein the seal body defines an opening to the annular cavity at a second axial end.

17. A pump comprising:
a housing including an axial bore;
a rod located within the axial bore; and
an annular seal located between the housing and the rod, the annular seal comprising:
a seal body forming first and second annular sealing surfaces, the first annular sealing surface being a radially innermost peripheral surface in contact with the rod, the second annular sealing surface located on a radially opposite side of the seal body from the first annular sealing surface and configured to be substantially parallel to the first annular sealing surface when engaged in and in contact with the housing, the first annular sealing surface including an annular ridge protruding substantially radially inwardly from the first annular sealing surface, the seal body including an annular cavity; and first and second annular springs located axially adjacent to each other in the annular cavity.

18. The pump of claim 17, wherein the seal body includes a flange extending radially at a first axial end, the flange engaging the housing.

19. The pump of claim 18, wherein the seal body defines an opening to the annular cavity at a second axial end axially opposite the first axial end.

20. The pump of claim 19, wherein an annular lip is defined on at least one side of the opening.

21. the pump of claim 19, wherein the location of a peak of the annular ridge is axially closer to the opening of the annular cavity than a center line of each of the first and second annular springs.

22. The pump of claim 17, wherein the second annular sealing surface and the annular cavity radially overlie the first annular sealing surface along a section line bisecting the annular cavity.

23. The pump of claim 17, wherein the rod comprises sapphire.

* * * * *

UNITED STATES PATENT AND TRADEMARK OFFICE
CERTIFICATE OF CORRECTION

PATENT NO. : 7,640,841 B2
APPLICATION NO. : 11/619116
DATED : January 5, 2010
INVENTOR(S) : Jonathan An et al.

It is certified that error appears in the above-identified patent and that said Letters Patent is hereby corrected as shown below:

Title Page, Item (73), "Worcester, MA" should be --Aurora, OH--.

Signed and Sealed this
Twenty-ninth Day of November, 2011

David J. Kappos
*Director of the United States Patent and Trademark Office*